United States Patent [19]

Kashiwa et al.

[11] 4,442,276

[45] Apr. 10, 1984

[54] PROCESS FOR POLYMERIZING OR COPOLYMERIZING OLEFINS

[75] Inventors: Norio Kashiwa, Iwakuni; Yoshihisa Ushida, Ohtake, both of Japan

[73] Assignee: Mitsui Petrochemical Industries, Ltd., Tokyo, Japan

[21] Appl. No.: 348,176

[22] Filed: Feb. 12, 1982

[51] Int. Cl.$^3$ .......................... C08F 4/02; C08F 10/00
[52] U.S. Cl. .................................. 526/125; 526/124; 526/128; 526/351; 526/352; 502/154
[58] Field of Search .......................................... 526/125

[56] References Cited

U.S. PATENT DOCUMENTS

| | | | |
|---|---|---|---|
| 4,180,636 | 12/1979 | Hirota et al. | 526/125 |
| 4,187,385 | 2/1980 | Iwao et al. | 526/125 |
| 4,304,891 | 12/1981 | Sato et al. | 526/114 |
| 4,335,015 | 6/1982 | Imai et al. | 526/125 |

*Primary Examiner*—Edward J. Smith
*Attorney, Agent, or Firm*—Sherman & Shalloway

[57] ABSTRACT

A process for polymerizing or copolymerizing olefins, which comprises polymerizing or copolymerizing olefins in the presence of a catalyst composed of (A) a solid titanium catalyst component obtained by reacting (i) a titanium composition composed essentially of tetravalent titanium, magnesium, halogen and an electron donor or electron donor residue selected from the group consisting of organic acid esters, alkoxy groups and aryloxy groups with (ii) an organic silicon compound having an Si—O—C bond in the molecule in the presence of (iii) an organoaluminum compound, or by first treating the titanium composition (i) with the organoaluminum compound (iii) and then reacting it with the organic silicon compound (ii), until the amount of the electron donor or electron donor residue in the titanium composition (i) decreases from that before the reaction, thus including a part of the silicon compound in the titanium composition, and; (B) an organoaluminum compound.

7 Claims, No Drawings

PROCESS FOR POLYMERIZING OR COPOLYMERIZING OLEFINS

This invention relates to a process for polymerizing or copolymerizing olefins by using an improved catalyst to provide a highly stereospecific olefin polymer or copolymer with high catalytic activity, and a polymer or copolymer of a high bulk density and in the case of an ethylene polymer or copolymer, a narrow distribution of molecular weight. Another advantage of the process is that troubles arising from an electron donor used as an ingredient of the catalyst and/or an electron donor used in the preparation of the catalyst, such as offensive odor or coloration, can be advantageously removed, and the amount of the organoaluminum compound as a catalyst ingredient can be reduced.

More specifically, this invention relates to a process for polymerizing or copolymerizing olefins, which comprises polymerizing or copolymerizing olefins in the presence of a catalyst composed of (A) a solid titanium catalyst component obtained by reacting (i) a titanium composition composed essentially of tetravalent titanium, magnesium, halogen and an electron donor or an electron donor residue selected from the group consisting of organic carboxylic acid esters, alkoxy groups and aryloxy groups (hereinafter, the electron donor and the electron donor residue may sometime be referred to inclusively as an electron donor) with (ii) an organic silicon compound having an Si—O—C bond in the molecule in the presence of (iii) an organoaluminum compound of a metal of Groups I to III of the periodic table, or treating the titanium composition (i) with the organoaluminum compound (iii) and then reacting it with the organic silicon compound (ii), until the amount of the electron donor in the titanium composition (i) decreases from that before the reaction, preferably until the content of the electron donor in the titanium composition (i) decreases to not more than 90 mole% from that before the reaction and becomes not more than 0.6 mole per Ti atom, preferably separating the resulting solid reaction product from the reaction mixture, and preferably washing the separated solid product with an inert organic solvent; and (b) an organoaluminum compound.

In the following description, homopolymerization and copolymerization will sometimes be referred to inclusively as polymerization, and likewise, a homopolymer and a copolymer, as a polymer.

Many proposals have already been made in the past for the use of a titanium catalyst ingredient composed of titanium, magnesium, halogen and as an optional component, an electron donor for the production of highly stereospecific polymers of alpha-olefins having at least 3 carbon atoms with a high catalytic efficiency.

With these prior proposals, it is usually necessary to use an electron donor as a catalyst component (may sometimes be used in the form of a complex with an organoaluminum compound or a Lewis acid) in addition to a titanium catalyst component and an organoaluminum compound so as to obtain polymers of a molding grade having high stereospecificity and moderate molecular weight by using hydrogen during polymerization. According to the catalyst systems previously suggested, the dependence of molecular weight on stereospecificity is high, and the decrease of stereospecificity index cannot be avoided when it is desired to produce polymers having a low molecular weight. If the use of the electron donor catalyst component is omitted, this decreasing tendency becomes remarkable, and it is difficult in practice to obtain polymers of a molding grade having such a stereospecificity as is industrially acceptable. Consequently, the use of the electron donor as a catalyst ingredient cannot be omitted and the resulting polymer frequently contains an unnegligible amount of a catalyst residue attributed to the electron donor. This catalyst residue causes an offensive odor and sometimes coloration in the resulting polymer. In addition, it is difficult to remove this cause of offensive odor by after-treating the polymer, and such would be disadvantageous both in operation and equipment. Another defect is that since some types of the electron donor consume the organoaluminum compound, the amount of the organoaluminum compound as a catalyst component should be very large.

The present inventors made investigations in order to develop a titanium catalyst component which can avoid the trouble of offensive odors attributed to an electron donor and therefore does not require a disadvantageous and difficult after-treatment for removing the cause of offensive odors, without sacrificing the favorable properties of a highly active titanium catalyst component, such as excellent catalytic activity and the ability to form a highly stereospecific olefin polymer or rather with a certain amount of improvement in these properties.

These investigations have led to the discovery that by reacting (i) a titanium composition composed essentially of tetravalent titanium, magnesium, halogen and an electron donor selected from the group consisting of organic acid esters, alkoxy groups and aryloxy groups with (ii) an organicsilicon compound having an Si—O—C bond in the molecule in the presence of (iii) an organoaluminum compound, or by treating the titanium composition (i) with the organoaluminum compound (iii) and then reacting it with the organic silicon compound (ii), the electron donor component in the titanium composition (i) can be replaced by the organosilicon compound (ii); that a catalyst composed of a solid titanium catalyst component (A) prepared by performing the above reaction until the content of the electron donor in the titanium composition (i) decreases from that before the reaction, and (B) an organoaluminum compound can give a highly stereospecific olefin polymer with high catalytic activity without the need to use an electron donor catalyst component in combination and has the advantage that a polymer having a high bulk density, especially an ethylene polymer having a narrow distribution of molecular weight, can be produced; and further that this catalyst can avoid the trouble of offensive odor attributed to the use of the electron donor as a catalyst component and/or in the preparation of the titanium catalyst component and does not require a difficult and disadvantageous after-treatment for the removal of the cause of offensive odors.

Investigations of the present inventors have shown that with this catalyst system, the dependence of molecular weight on stereospecificity is small, and even when the use of an electron donor catalyst component is omitted, a polymer having sufficiently high stereospecificity can be produced; that the catalytic activity of this catalyst per unit amount of titanium is high, and the bulk density of the resulting polymer is also high; that when it is applied to the polymerization of ethylene, an ethylene polymer having a narrow molecular weight distribution can be produced; and further that the aforesaid trouble of offensive odor can be markedly reduced or avoided.

There have been prior examples in which the organicsilicon compound specified by this invention is used in the production of a titanium catalyst component. But in most of them, the organic silicon compound is used in the step of preparing a carrier to be reacted with a titanium compound, or in the step of reacting a titanium compound. There has been no example, either in existence or known, in which the organicsilicon compound is reacted with a separately prepared titanium composition in the presence of an organometallic compound so as to replace the electron donor component by the organosilicon compound.

For example, Japanese Laid-Open Patent Publication No. 111281/1976 suggests a process for polymerizing olefins by using a catalyst composed of a titanium catalyst component and an organometallic complex, the titanium catalyst component being prepared by reacting a titanium composition containing trivalent titanium resulting from the reaction of a specified organomagnesium compound with a titanium compound, with an alkoxysilane. Even if such a catalyst is applied to the polymerization of alpha-olefins having at least 3 carbon atoms, a polymer having high stereospecificity cannot be obtained.

Japanese Laid-Open Patent Publication No. 36203/1980 proposes a catalyst for the polymerization of olefins composed of [A] a solid titanium catalyst component and [B] a combination of an organometallic compound, preferably an organoaluminum compound, and a specified alkoxysilane, the titanium catalyst component [A] being obtained by reacting and/or pulverizing three components: i.e., (1) a solid obtained by reacting a specified hydrocarbon-soluble organic magnesium compound or a reaction product of it with a complex-forming compound selected from the group consisting of ethers, thioethers, ketones, aldehydes, carboxylic acids, carboxylic acid derivatives, alcohols, thioalcohols and amines, with a specified chlorosilane compound having an Si—H bond, (2) a titanium compound having at least one halogen atom and (3) an electron donor selected from the group consisting of nitrogen-containing hetereocyclic carboxylic acid esters, oxygen-containing heterocyclic carboxylic acid esters, and sulfur-containing heterocyclic carboxylic acid esters. It is stated in this patent publication that as the catalyst component [B], the above two components may be mixed in advance and then added to the polymerization reaction system, or they may be added separately to the polymerization system.

To the best of the knowledges of the present inventors, however, it has been completely unknown and not described in any known literature including the above-cited prior art literature that a catalyst composed of (A) a solid titanium catalyst component of a reduced content of electron donor prepared by reacting the titanium composition (i) with the organic silicon compound (ii) in the presence of the organoaluminum compound (iii), or by treating the titanium composition (i) with the organoaluminum compound (iii) and then reacting it with the organic silicon compound (ii), thereby inducing a substitution reaction between the electron donor in the titanium composition (i) and the organicsilicon compound (ii), and [B] an organoaluminum compound catalyst component is used in the polymerization of olefins, and the use of this catalyst system can avoid the trouble of offensive odors from the polymer and achieve many other advantages.

It is an object of this invention therefore to provide an improved process for polymerizing or copolymerizing olefins.

The above and other objects and advantages of this invention will become more apparent from the following description.

The titanium composition (i) used to form the solid titanium catalyst component (A) in this invention is a solid compound composed essentially of tetravalent titanium, magnesium, halogen and an electron donor selected from the group consisting of organic acid esters, alkoxy groups and aryloxy groups. This titanium composition (i) contains a magnesium halide having lower crystallinity than commercially available magnesium halides, and has a specific surface area of at least 3 m$^2$/g, preferably 10 to 1000 m$^2$/g, more preferably 40 to 800 m$^2$/g. Its composition does not substantially change upon washing with hexane at ordinary temperatures. Preferably, the proportions of the individual ingredients in the titanium composition (i) are such that the atomic ratio of halogen to titanium is from about 5 to about 200, especially from about 5 to about 100, and the atomic ratio of magnesium to titanium is from about 2 to about 100, especially from about 4 to about 50. The titanium composition (i) further includes the electron donor selected from the above group. Preferably, the amount of the electron donor is such that the mole ratio of the electron donor to titanium is from about 0.05 to about 6, especially from about 0.1 to about 5. If desired, the titanium composition (i) may contain another metal or element such as aluminum, silicon, tin and phosphorus.

The titanium composition (i) can be obtained by, for example, contacting a magnesium compound, a tetravalent titanium compound and the electron donor with each other. If desired, reaction reagents such as a compound of silicon or aluminum, may also be used.

Typical examples of the method of producing the titanium composition are disclosed, for example, in Japanese Patent Publications Nos. 32270/1975 (corresponding to U.S. Pat. No. 4,071,674) and 46799/1978, Japanese Laid-Open Patent Publication Nos. 126590/1975 (corresponding to British Pat. No. 1,527,736), 20297/1976 (corresponding to British Pat. No. 1,492,618), 28189/1976 (corresponding to U.S. Pat. No. 4,076,924), 64586/1976, 92885/1976 (corresponding to U.S. Pat. No. 4,085,276), 136625/1976, 87489/1977 (corresponding to U.S. Pat. No. 4,250,285), 100596/1977, 147688/1977 (corresponding to U.S. Pat. No. 4,232,139), 104593/1977 (corresponding to U.S. Pat. No. 4,143,223), and 43094/1978 (corresponding to U.S. Pat. No. 4,149,990), and German Laid-Open Patent Application No. 3,022,738 and European Patent Laid-Open Patent Application No. 22,376.

Several examples of the method are described briefly below.

(1) A solid described in the following (i) to (iii) is reacted with a titanium compound which is liquid under the reaction conditions;

(i) a complex of the magnesium compound and an electron donor.

(ii) a solid product obtained by pulverizing a magnesium compound or a complex of the magnesium compound and an electron donor in the presence or absence of an electron donor and/or a pulverization aid.

(iii) a solid product obtained by treating a magnesium compound or a solid of above (i) or (ii) with a compound such as an electron donor, an organoaluminum compound, a halogen-containing silicon compound and a mixture thereof.

These reactions are carried out by selecting the reactants such that the resulting reaction product may contain titanium, magnesium, halogen and an electron donor as essential ingredients.

(2) A liquid-state magnesium compound having no reducing ability is reacted with a liquid tetravalent titanium compound in the presence of an electron donor to precipitate a solid titanium composition.

(3) The product obtained in (2) is reacted with a tetravalent titanium compound.

(4) The product of (1) or (2) is further reacted with an electron donor and a tetravalent titanium compound.

Examples of the magnesium compound used in the preparation of the solid titanium composition (i) include magnesium oxide, magnesium hydroxide, hydrotalcite, magnesium carboxylates, alkoxymagnesiums, aryloxymagnesiums, alkoxymagnesium halides, aryloxymagnesium halides, magnesium dihalides, organomagnesium compounds and products obtained by treating organomagnesium compounds with electron donors, halosilanes, alkoxysilanes, silanols and aluminum compounds.

The organoaluminum compound used in the preparation of the titanium composition (i) may be properly selected from compounds examplified hereinbelow as the organoaluminum compound (B) as a catalyst ingredient.

Examples of the halogen-containing silicon compound which may be used in the preparation of the titanium composition (i) include silicon tetrahalides, silicon alkoxyhalides, silicon alkylhalides and halopolysiloxanes. The alkyl group in the silicon compounds may, for example, be an alkyl group having 1 to 10 carbon atoms, and the alkoxy group in the silicon compound may, for example, be an alkoxy group having 1 to 10 carbon atoms. The halogen in the silicon compound may, for example, be chloro, iodo, bromo and fluoro.

Examples of the tetravalent titanium compound used in the preparation of the titanium composition (i) include titanium tetrahalides, alkoxytitanium halides, aryloxy titanium halides, alkoxy titaniums, and aryloxytitaniums. Titanium tetrahalides, above all titanium tetrachloride, are preferred. The alkoxy group in the titanium compound may, for example, be an alkoxy group having 1 to 10 carbon atoms, and examples of the aryloxy group are those having 6 to 12 carbon atoms. Examples of the halogen are chloro, iodo, bromo and fluoro.

The electron donor used in the production of the titanium composition (i) is selected from the group consisting of organic acid esters, alkoxy groups and arylox groups. The electron donors which can be used in the production of the titanium composition may be oxygen-containing electron donors such as alcohols, phenols, carboxylic acids, and organic acid esters. Specific examples include alcohols having 1 to 18 carbon atoms such as methanol, ethanol, propanol, pentanol, hexanol, octanol, 2-ethylhexanol, dodecanol, octadecyl alcohol, benzyl alcohol, phenylethyl alcohol, cumyl alcohol and isopropylbenzyl alcohol; phenols having 6 to 25 carbon atoms which may have an alkyl group, such as phenol, cresol, xylenol, ethylphenol, propylphenol, cumylphenol, nonylphenol and naphthol; organic acid esters having 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, ethyl crotonate, dibutyl maleate, diethyl butylmalonate, diethyl dibutylmalonate, ethyl cyclohexanecarboxylate, diethyl 1,2-cyclohexanedicarboxylate, di-(2-ethylhexyl) 1,2-cyclohexanedicarboxylate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, dioxytyl phthalate, gamma-butyrolactone, delta-valerolactone, coumarin, phthalide, ethylene carbonate.

These electron donors can be used in a combination of two or more.

In the production of the titanium composition, other electron donors such as ketones, aldehydes, inorganic acid esters, amines, ammonia and nitriles may also be used.

The use of alcohols, phenols and organic acid esters is especially preferred.

The halogen atom which constitutes the titanium composition (i) may be fluorine, chlorine, bromine, iodine or mixtures of these. Chlorine is especially preferred.

Electron donors desirably included in the titanium composition (i) are organic acid esters. Examples of the organic acid esters may be those given hereinabove. Typical examples of preferred organic acid esters are those having 8 to 24 carbon atoms, especially alkyl esters (preferably $C_1$–$C_{12}$ alkyl esters) of aliphatic dicarboxylic acids such as maleic acid, malonic acid and alkylmalonic acids, alicyclic dicarboxylic acids such as cyclohexanedicarboxylic acid, aromatic monocarboxylic acids such as benzoic acid, lower alkylbenzoic acids and lower alkoxybenzoic acids and aromatic dicarboxylic acids such as phthalic acid. These esters may have a substituent. There may be present, in addition, electron donors free from active hydrogen, such as inorganic acid esters, ethers, ketones, tertiary amines, acid halides and acid anhydrides.

The electron donor residue which is preferably contained in the titanium composition includes alkoxy groups, preferably alkoxy groups having 1 to 10 carbon atoms, and aryloxy groups, preferably aryloxy groups having 6 to 20 carbon atoms. These alkoxy or aryloxy groups may be present in the form of compounds represented by the formula $(RO)_m AlX_{3-m}$ or $(RO)_n TiX_{4-n}$. In these formulae, R represents a $C_1$–$C_{10}$ alkyl or $C_6$–$C_{20}$ aryl group, m is a number represented by $0 < m \leq 3$, n is a number represented by $0 < n \leq 4$, and X represents a halogen atom.

Typical examples of the alkoxy or aryloxy group are methoxy, ethoxy, propoxy, butoxy, ethylhexoxy, phenoxy, methylphenoxy, dimethylphenoxy, ethylphenoxy and butylphenoxy groups.

Among the above electron donors preferably included in the titanium composition, the organic acid esters are especially suitable in order to obtain a polymer or copolymer having high stereospecificity by polymerization or copolymerization of olefins having at least 3 carbon atoms, or by copolymerization of an olefin having at least 3 carbon atoms with a minor proportion of ethylene. Above all, alkyl esters of organic polycarboxylic acids with 8 to 24 carbon atoms, for example esters of substituted or unsubstituted aliphatic dicarboxylic acids such as malonates, succinates and maleates; esters of alicyclic dicarboxylic acids such as cyclohexyldicarboxylates, and esters of aromatic dicarboxylic acids such as phthalates, are preferred.

In the present invention, the solid titanium catalyst component (A) can be formed by reacting the titanium composition (i) obtained as above with the organic silicon compound (ii) having an Si—O—C bond in the molecules in the presence of the organoaluminum compound (iii), or by first treating the titanium composition (i) with the organoaluminum compound (iii) and then reacting it with the organic silicon compound (ii). The first-mentioned reaction of (i) with (ii) in the presence of (iii) is preferred.

Examples of the organic silicon compound (ii) include alkoxysilanes and aryloxysilanes. As such organic silicon compound (ii), there can be cited silicic acid esters of the formula $R^2Si(OR^1)_{4-p}$ wherein n is a number represented by $0 \leq p \leq 3$, and $R^2$ is a hydrocarbon group or a halogen atom, R represents a hydrocarbon group, and when there are a plurality of $R^2$ and/or $OR^1$ groups, these $R^2$ groups or these $OR^1$ groups may be identical or different. Examples of the hydrocarbon group for $R^2$ include alkyl groups preferably having 1 to 10 carbon atoms, cycloalkyl groups preferably having 6 to 20 carbon atoms, aryl groups preferably having 6 to 20 carbon atoms, alkenyl groups preferably having 2 to 10 carbon atoms, haloalkyl groups preferably $C_1$-$C_{10}$ alkyl groups substituted by chlorine, bromine, iodine and/or fluorine, more preferably those substituted by chlorine, and aminoalkyl groups preferably $C_1$-$C_{10}$ alkyl groups substituted by amino groups. Examples of the hydrocarbon group $R^1$ include alkyl groups preferably having 1 to 10 carbon atoms, cycloalkyl groups preferably having 6 to 20 carbon atoms, aryl groups preferably having 6 to 20 carbon atoms, alkenyl groups preferably having 2 to 10 carbon atoms, and alkoxyalkyl groups preferably ($C_1$-$C_8$)alkoxy ($C_1$-$C_8$)alkyl groups.

Other examples of the organic silicon compounds (ii) may include siloxanes having similar $OR^1$ groups to the above, and silyl esters of carboxylic acids. Another example includes compounds having an Si—O—C bond produced by reacting a compound free from an Si—O—C bond with a compound having an O—C bond in advance or in situ. A combination of $SiCl_4$ and an alcohol may be cited as a typical example. The organic silicon compound (ii) may also include another metal such as aluminum or tin.

More specific examples of the organosilicon compound (ii) include trimethylmethoxysilane, trimethylethoxysilane, dimethyldimethoxysilane, dimethyldiethoxysilane, diphenyldimethoxysilane, methylphenyldimethoxysilane, diphenyldiethoxysilane, ethyltrimethoxysilane, vinyltrimethoxysilane, methyltrimethoxysilane, phenyltrimethoxysilane, gamma-chloropropyltrimethoxysilane, methyltriethoxysilane, ethyltriethoxysilane, vinyltriethoxysilane, butyltriethoxysilane, phenyltriethoxysilane, gamma-aminopropyltriethoxysilane, chlorotriethoxysilane, ethyltriisopropoxysilane, vinyltributoxysilane, ethyl silicate, butyl silicate, trimethylphenoxysilane, methyltriallyloxysilane, vinyl tris (beta-methoxyethoxy)silane, vinyltriacetoxysilane and dimethyltetraethoxydisiloxane. Of these, alkoxysilanes of the formula $R_nSi(OR^1)_{4-n}$ in which n is 0, 1 or 2 such as methyltrimethoxysilane, phenyltrimethoxysilane, methyltriethoxysilane, ethyltriethoxysilane, vinyltriethoxysilane, phenyltriethoxysilane, vinyltributoxysilane, ethyl silicate, diphenyldimethoxysilane, methylphenyldimethoxysilane, and diphenyldiethoxysilane are especially preferred.

The reaction of the titanium composition (i) with the organic silicon compound (ii) in the presence of the organometallic compound (iii) or the reaction of (i) with (ii) following the treatment of (i) with (iii) for the formation of the solid titanium catalyst component (A) can be carried out in an inert organic solvent, preferably an inert hydrocarbon solvent.

Suitable organometallic compounds (ii) to be present in the above reaction are the same compounds as exemplified hereinbelow with regard to the organoaluminum compound (B). The use of trialkyl aluminums is especially preferred.

Examples of especially suitable inert hydrocarbon solvents which can be used in the above reaction are aliphatic hydrocarbons such as n-pentane, isopentane, n-hexane, n-heptane, n-octane, iso-octane, n-decane, n-dodecane, kerosene and liquid paraffin; alicyclic hydrocarbons such as cyclopentane, methylcyclopentane, cyclohexane and methylcyclohexane; aromatic hydrocarbons such as benzene, toluene, xylene and ethylbenzene; and mixtures of these.

The ratio between the titanium composition (i) and the organic silicon compound (ii) can be properly selected. Desirably, about 0.05 to about 200 moles, preferably about 0.1 to about 50 moles, especially about 1 to about 40 moles, of the organic silicon compound (ii) is selected per gram-atom of titanium in the titanium composition (i). The organic silicon compound (ii) may be used in an amount above the above-mentioned upper limit, but this does not give better results and is economically disadvantageous.

In the above reaction, it is preferred to suspend the titanium composition (i) in the inert organic solvent to a concentration of, for example, about 0.001 to about 500 millimoles/liter calculated as titanium atom, and contacted at a temperature of, for example, not more than about 90° C., preferably about −20° C. to about +60° C., for a period of, for example, about 0.5 to about 1800 minutes, preferably about 1 to about 180 minutes.

By reacting the titanium composition (i) with the organic silicon compound (ii) in the presence of the organoaluminum compound (iii) as above, or by first treating the titanium composition (i) with the organoaluminum compound (iii) and then reacting it with the organic silicon compound (ii) as above, at least a part of the electron donor component in the titanium composition (i) is liberated and replaced by the organic silicon compound (ii), whereby the content of the electron donor in the titanium composition (i) decreases from that before the reaction.

Preferably, the reaction is carried out until the content of the electron donor in the titanium composition (i) decreases to not more than 90 mole%, preferably not more than 70 mole%, of that before the reaction and becomes not more than 0.6 mole, preferably not more than 0.5 mole, per gram-atom of Ti. Desirably, the amount of the organic silicon compound (ii) deposited which is to be contained in the resulting solid titanium catalyst component (A) reaches about 0.1 to about 50 moles, preferably about 0.3 to about 10 moles, more preferably about 0.3 to about 5 moles, per gram-atom of titanium in the catalyst component (A).

It is especially preferred therefore to perform the above reaction by selecting the amount of the organic silicon compound (ii), the reaction temperature and the reaction time so that they satisfy the conditions regarding the decrease of the amount of the electron donor and the conditions regarding the increase of the content of the organic silicon compound (ii).

The amount of the organoaluminum compound (iii) used can be properly selected. For example, it is about 0.05 to about 1000 moles, preferably about 0.1 to about 500 moles, per gram-atom of titanium in the titanium composition (i).

The reaction is carried out preferably in an atmosphere of an inert gas such as nitrogen or argon. It may also be carried out in the co-presence of ethylene or propylene.

The solid titanium catalyst ingredient (A) used in this invention can be obtained by separating the solid reaction product, which is obtained by the above reaction of the titanium composition (i) with the organic silicon compound (ii) in the presence of the organoaluminum compound (iii), or by the reaction of the titanium composition (i) with the silicon compound (ii) following the treatment of (i) with the organoaluminum compound (iii), the reaction being carried out until the content of the electron donor in the titanium composition (i) decreases from that before the reaction, preferably until the content of the electron donor in the titanium composition (i) decreases to 90 mole% or less of that before the reaction and becomes not more than 0.6 mole per gram-atom of Ti to substitute the organic silicon compound (iii), from the reaction mixture (for example, by filtration); and washing the solid product with an inert organic solvent, preferably an inert hydrocarbon solvent. Preferred inert hydrocarbon solvents may be those aliphatic hydrocarbons, alicyclic hydrocarbons, and aromatic hydrocarbons which are exemplified hereinabove in regard to the above-reaction of forming the solid product.

Organoaluminum compounds having at least one Al—C bond in the molecule can be preferably used as the organoaluminum compound as a catalyst component (B) to be combined with the solid titanium catalyst component (A) to provide the catalyst of this invention.

Examples include (i) organoaluminum compounds of the general formula

wherein $R^3$ and $R_4$ are identical or different and each represents a hydrocarbon group usually containing 1 to 15 carbon atoms, preferably 1 to 4 carbon atoms, for example an alkyl, alkenyl or aryl group, X represents a halogen, preferably a chlorine atom, 9 is a number represented by $0<q\leqq 3$, r is a number represented by $0\leqq r<3$, s is a number represented by $0\leqq s<3$, and t is a number represented by $0\leqq t<3$, provided that $q+r+s+t=3$, and (ii) complex alkylated compounds of metals of Group I of the periodic table and aluminum which are represented by the following formula

wherein $M^1$ represents Li, Na and K and $R^3$ is as defined above.

The organoaluminum compounds (i) include those of general formula $R_{q'}^3Al(OR^4)_{3-q'}$ wherein $R^3$ and $R^4$ are as defined above and q' is preferably $1.5\leqq q'<3$; those of general formula $R_{q''}^3AlX_{3-q''}$ wherein $R^3$ and X are as defined above and q'' is preferably $0<q''<3$; those of the general formula $R_{q''}^5AlH_{3-q''}$ wherein $R^3$ is as defined above, and q'' is preferably $2\leqq q''<3$; and those of the general formula $R_q^3Al(OR^4)_rX_t$ wherein $R^3$, $R^4$ and X are as defined above, $0<q\leqq 3$, $0\leqq r\leqq 3$, $0\leqq t<3$ and $q+r+t=3$.

Specific examples of the organoaluminum compounds (i) are trialkyl aluminums such as triethyl aluminum, tributyl aluminum and trihexyl aluminum; trialkenyl aluminums such as triisoprenyl aluminum; dialkyl aluminum alkoxides such as diethylaluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having an average composition expressed by $R_{2.5}^3Al(OR^4)_{0.5}$ wherein $R^3$ and $R^4$ are as defined hereinabove; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride, and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; partially hydrogenated alkyl aluminums such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide. There may also be used organoaluminum compounds in which two or more aluminums are bonded to each other through an oxygen or nitrogen atom, such as $(C_2H_5)_2AlOAl(C_2H_5)_2$, $(C_4H_9)_2AlOAl(C_4H_9)_2$ and

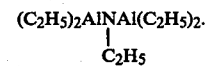

Examples of the compounds (ii) are $LiAl(C_2H_5)_4$, and $LiAl(C_7H_{15})_4$.

Of the above-exemplified organoaluminum compounds (B), trialkyl aluminums and mixtures thereof with alkyl aluminum halides are preferred.

According to the process of this invention, olefins may be homopolymerized, or copolymerized with each other or with other polymerizable monomers such as polyenes. The process can afford not only highly crystalline polymers but also low crystalline polymers or amorphous polymers. Examples of the olefins which can be used in polymerizations include olefins having 2 to 12 carbon atoms, preferably 2 to 8 carbon atoms, such as ethylene, propylene, 1-butene, 1-pentene, 1-hexene, 1-octene, 1-decene, 1-dodecene, 1-tetradecene, 1-octadecene, 3-methyl-1-pentene, 4-methyl-1-pentene, 4,4-dimethyl-1-pentene and 3,3-dimethyl-1-butene.

Examples of polyenes which can be used for copolymerization with these olefins include butadiene, isoprene, 1,4-hexadiene, 1,7-oxtadiene, 1,3,7-octatriene, 2,4,6-octatriene, 5-ethylidene-2-norbornene, 5-vinyl-2-norbornene and dicyclopentadiene.

When the process of this invention is applied to the polymerization of alpha-olefins having at least 3 carbon atoms, polymers having high stereospecificity can be obtained. When the polymerization is carried out in the vapor phase or in slurry, polymers having a high bulk density can be obtained. Application of the process to the polymerization of ethylene makes it possible to produce polymers having a narrow molecular weight distribution.

These advantages can be fully achieved by using the catalyst composed solely of the catalyst ingredients (A) and (B). In order, however, to enhance these advantages or obtain another advantage, it is possible to use an additive in the polymerization system. Examples of the additive include electron donors such as those exemplified hereinabove for use in the preparation of the ingredient (A), silicon compounds exemplified hereinabove for use in the preparation of the ingredient (A), other organic metal compounds such as diethylzinc and dialkylmagnesiums, halogens, halogen compounds such as halogenated hydrocarbons, silicon halides, aluminum halides, and hydrogen as a molecular weight controlling agent.

The polymerization of olefins may be carried out in the liquid or vapor phase in the presence or absence of an inert diluent. In the liquid-phase polymerization, a slurry polymerization method or a solution polymerization method may be used.

Examples of the inert diluent which can be used in the polymerization include aliphatic hydrocarbons such as propane, butane, pentane, hexane, heptane, octane, decane and kerosene; alicyclic hydrocarbons such as cyclopentane, cyclohexane, methylcyclopentane and methylcyclohexane; aromatic hydrocarbons such as benzene, toluene, xylene and ethylbenzene and mixtures of two or more of these.

The amount of the titanium catalyst component (A) used in the polymerization system is suitably about 0.005 to about 1 millimole, preferably about 0.001 to about 0.5 millimole, per liter of the volume of the reaction system. The amount of the organoaluminum compound (B) is such that the atomic ratio of aluminum to titanium is from about 1 to about 2000, preferably from about 1 to about 500.

The polymerization temperature is, for example, about 0° to about 300° C., preferably about 20° to about 200° C., and the polymerization pressure is, for example, from atmospheric pressure to about 100 kg/cm$^2$-G, preferably about 2 to about 50 kg/cm$^2$-G.

The polymerization can be carried out by any of batchwise, semi-continuous and continuous methods. For industrial practice, the continuous polymerization method is preferred. The polymerization may be carried out in a multiplicity of steps, and the molecular weight or composition of the resulting product may be varied from step to step.

The following examples illustrate the present invention more specifically. In these examples, an offensive odor from the polymer was organoleptically tested by a panel of 10 well-trained specialists. A sample used for the test was obtained by separating and recovering the polymer after the polymerization and drying it to form a powdery polymer (the powdery polymer was not subjected to any further treatment).

The results were evaluated on the following scale.

| Standard | Grade |
|---|---|
| Evident offensive odor | A |
| Moderate offensive odor | B |
| Weak offensive odor | C |
| No appreciable odor | D |

EXAMPLE 1

[I] Synthesis of a catalyst

A 3-liter autoclave was fully purged with nitrogen gas, and then charged with 1.5 liters of purified kerosene, 75 g of commercially available MgCl$_2$, 109 g of ethanol and 10 g of Emasol 320 (a tradename for a product of Kao-Atlas Co., Ltd.; sorbitan distearate). The contents were heated with stirring, and stirred at 125° C. for 20 minutes at 600 rpm. The inside of the autoclave was pressurized with N$_2$ to 10 kg/cm$^2$-G. A cock of a stainless steel (SUS) tube having an inside diameter of 3 mm and kept at 125° C. which was directly connected to the autoclave was opened to transfer the mixture to a 5-liter glass flask equipped with a stirrer which had been filled with 3 liters of purified kerosene cooled at −15° C. The amount of the mixture transferred was 1 liter, and the time required for the transfer was about 20 seconds. The resulting solid was collected by filtration, and washed fully with hexane. Microscopic observation showed that the solid was in the form of a true sphere with a particle diameter of 5 to 30 microns.

A 3-liter glass flask was charged with 1.5 liters of TiCl$_4$, and 75 g of the above solid suspended in 150 mg of purified kerosene was added at 20° C. with stirring. Then, 12.9 ml of diisobutyl phthalate was added, and the mixture was heated to 120° C. The mixture was stirred for 1 hour, and then the stirring was stopped. The supernatant portion was removed by decantation, and 1.5 liters of TiCl$_4$ was freshly added. The mixture was stirred at 130° C. for 2 hours. The solid portion was collected by hot filtration, and washed fully with hot kerosene and hexane to obtain a titanium composition which contained, as atoms, 2.3% by weight of tetravalent Ti, 63.0% by weight of Cl, 20.0% by weight of Mg and 9.9% by weight of diisobutyl phthalate. Two grams of the titanium composition was suspended in 100 ml of purified kerosene, and 1.2 ml of triethyl aluminum and 0.7 ml of phenyltriethoxysilane were added. The mixture was stirred at 20° C. for 1 hour. Then, the solid portion was collected by filtration and washed with kerosene to obtain a titanium catalyst component which contained, as atoms, 2.1% by weight of Ti, 60.0% by weight of Cl, 19.0% by weight of Mg, 1.8% by weight of diisobutyl phthalate and 1.3% by weight of Si.

[II] Polymerization

Hexane (0.75 liter) was charged into a 2-liter autoclave, and under an atmosphere of propylene, 0.75 mmole of triethyl aluminum and 0.015 mmole, as Ti atom, of the titanium catalyst component were fed into the autoclave. Then, 200 Nml of H$_2$ was introduced, and the inside of the autoclave was heated to 70° C. The total pressure of the reaction system was increased to 7.0 kg/cm$^2$-G with propylene. While maintaining the propylene pressure, propylene was polymerized for 2 hours. After the polymerization, the polymer slurry was filtered to give 377 g of a powdery polymer having a boiling n-heptane extraction residue of 97.5%, a bulk density of 0.42 g/ml and an MI of 4.9 g/10 min. The polymer had an average particle diameter of 390 microns and such a particle size distribution that 98% by weight of the polymer had a particle diameter in the range of 0.1 to 1.0 mm. The polymer was of spherical shape.

Concentration of the filtrate gave 4.1 g of a solvent-soluble polymer. Accordingly, the average specific polymerization activity of the titanium catalyst component was 25,400 g of polypropylene/mmole of Ti.

EXAMPLES 2 TO 10

The procedure of Example 1 was followed except that in the preparation of the catalyst, the conditions for treating the titanium composition with triethyl aluminum and phenyltriethoxysilane were changed as shown in Table 1. The results are shown in Table 1.

COMPARATIVE EXAMPLE 1

The same polymerization as in Example 1 was performed except that the titanium composition obtained in Example 1 was used alone without further treatment. The results are also shown in Table 1.

TABLE 1

| | Conditions for the contacting treatment with the titanium composition | | | | Titanium catalyst (wt. %) | | |
|---|---|---|---|---|---|---|---|
| Example | Amount (ml) of phenyl-triethoxysilane | Amount (ml) of triethyl aluminum | Temperature (°C.) | Time (min.) | Ti | Diisobutyl phthalate | Si |
| 1 | 0.70 | 1.20 | 20 | 60 | 2.1 | 1.8 | 1.3 |
| 2 | 0.23 | 0.40 | 20 | 60 | 2.3 | 5.9 | 0.7 |
| 3 | 0.46 | 0.26 | 20 | 60 | 2.2 | 6.2 | 0.6 |
| 4 | 1.16 | 3.29 | 20 | 60 | 2.1 | 1.2 | 1.1 |
| 5 | 4.64 | 7.90 | 20 | 60 | 1.8 | 0.4 | 1.6 |
| 6 | 4.64 | 7.90 | 40 | 60 | 1.7 | 0.2 | 2.1 |
| 7 | 4.64 | 7.90 | 60 | 60 | 1.7 | 0.1 | 2.8 |
| 8 | 4.64 | 7.90 | 20 | 5 | 2.0 | 3.7 | 0.9 |
| 9 | 4.64 | 7.90 | 20 | 180 | 1.8 | 0.3 | 1.8 |
| 10 | 0.23 | 0.40 | 20 | 1200 | 2.0 | 2.0 | 1.0 |
| 1* | — | — | — | — | 2.3 | 9.9 | — |

| | Results of Polymerization | | | | | |
|---|---|---|---|---|---|---|
| Example | Powdery polymer (g) | n-Heptane extraction residue (%) | Bulk density (g/ml) | MI (g/10 min.) | Solvent soluble polymer (g) | Specific polymerization activity (g-pp/mmole-Ti) |
| 1 | 377 | 97.5 | 0.42 | 4.9 | 4.1 | 25,400 |
| 2 | 370 | 96.2 | 0.42 | 7.9 | 6.8 | 25,100 |
| 3 | 298 | 95.4 | 0.40 | 11.5 | 6.9 | 20,300 |
| 4 | 315 | 97.7 | 0.44 | 8.9 | 2.7 | 21,200 |
| 5 | 357 | 98.5 | 0.44 | 6.5 | 2.2 | 23,900 |
| 6 | 299 | 98.0 | 0.44 | 8.3 | 2.6 | 20,100 |
| 7 | 208 | 98.0 | 0.43 | 15.0 | 1.7 | 14,000 |
| 8 | 248 | 95.9 | 0.40 | 8.8 | 5.7 | 16,900 |
| 9 | 391 | 98.2 | 0.44 | 5.3 | 3.1 | 26,300 |
| 10 | 355 | 97.4 | 0.41 | 4.7 | 2.9 | 23,900 |
| 1* | 298 | 80.2 | 0.34 | 37.0 | 46.5 | 23,000 |

*Comparative Example

EXAMPLES 11 TO 18

The procedure of Example 1 was repeated except that in the preparation of the catalyst, the organic silicon compound or the organoaluminum compound for use in treating the titanium composition was changed as shown in Table 2. The results are shown in Table 2.

TABLE 2

| | | | Titanium catalyst (wt. %) | | |
|---|---|---|---|---|---|
| Example | Organic silicon compound (ml) | Organoaluminum compound (ml) | Ti | Diisobutyl phthalate | Si |
| 11 | Methyltrimethoxysilane (0.41) | Triethyl aluminum (1.20) | 2.0 | 2.5 | 1.5 |
| 12 | Ethyltriethoxysilane (0.62) | Triethyl aluminum (1.20) | 2.0 | 1.3 | 1.5 |
| 13 | Vinyltriethoxysilane (0.59) | Triethyl aluminum (1.20) | 2.2 | 2.1 | 1.2 |
| 14 | Chlorotriethoxylsilane (0.64) | Triethyl aluminum (1.20) | 2.3 | 3.3 | 0.4 |
| 15 | Vinyltributoxysilane (0.90) | Triethyl aluminum (1.20) | 2.3 | 4.1 | 0.6 |
| 16 | Ethyl silicate (0.64) | Triethyl aluminum (1.20) | 2.1 | 1.6 | 1.1 |
| 17 | Phenylethoxysilane (0.70) | Triisobutyl aluminum (2.20) | 2.2 | 2.0 | 1.1 |
| 18 | Phenylethoxysilane (0.70) | Diethyl aluminum chloride (1.09) | 2.1 | 5.4 | 0.6 |

| | Results of Polymerization | | | | | |
|---|---|---|---|---|---|---|
| Example | Powdery polymer (g) | n-Heptane extraction residue (%) | Bulk density (g/ml) | MI (g/10 min.) | Solvent-soluble polymer (g) | Specific polymerization activity (g-pp/mmole-Ti) |

TABLE 2-continued

| | | | | | | |
|---|---|---|---|---|---|---|
| 11 | 97 | 97.1 | 0.40 | 14.4 | 1.1 | 6,500 |
| 12 | 302 | 97.4 | 0.41 | 8.6 | 3.4 | 20,400 |
| 13 | 247 | 97.3 | 0.41 | 9.9 | 3.0 | 16,700 |
| 14 | 159 | 93.7 | 0.42 | 15.1 | 3.3 | 10,800 |
| 15 | 179 | 93.8 | 0.40 | 16.4 | 2.5 | 12,100 |
| 16 | 355 | 96.2 | 0.40 | 13.0 | 4.5 | 24,000 |
| 17 | 367 | 96.8 | 0.42 | 5.3 | 4.4 | 24,800 |
| 18 | 346 | 94.2 | 0.40 | 13.7 | 8.6 | 23,600 |

EXAMPLES 19 TO 29

The procedure of Example 1 was followed except that in the preparation of the catalyst, each of the electron donors shown in Table 3 was used instead of diisobutyl phthalate in the preparation of the titanium composition, and the amounts of $TiCl_4$, the $MgCl_2$-ethanol adduct and purified kerosene were decreased respectively to one-tenth of those used in Example 1. The results are shown in Table 3.

[II] Polymerization

Using the resulting titanium catalyst instead of the titanium catalyst component used in Example 1, the same polymerization as in Example 1 was performed. There was obtained 351 g of a powdery polymer by filtration. The polymer had a boiling n-heptane extraction residue of 96.3%, a bulk density of 0.37 and an MI of 6.2 g/10 min. Concentration of the filtrate gave 5.4 g of a solvent-soluble polymer. Accordingly, the average

TABLE 3

| | | | Titanium catalyst (wt. %) | | Powdery polymer (g) | n-Heptane extraction residue (%) | Bulk density (g/ml) | MI (g/10 min.) | Solvent-soluble polymer (g) | Specific polymerization activity (g-pp/mmole-Ti) |
|---|---|---|---|---|---|---|---|---|---|---|
| Example | Electron donor Type | Amount (ml) | Ti | Si | | | | | | |
| 19 | Diethyl phthalate | 0.96 | 2.6 | 2.0 | 289 | 97.5 | 0.42 | 4.0 | 1.8 | 19,400 |
| 20 | Di-n-butyl phthalate | 1.29 | 1.6 | 1.8 | 376 | 98.0 | 0.41 | 3.2 | 4.0 | 25,300 |
| 21 | Di(2-ethylhexyl)phthalate | 2.03 | 2.2 | 2.3 | 386 | 96.5 | 0.40 | 2.5 | 3.7 | 26,000 |
| 22 | Diphenyl phthalate | 1.38 g | 1.9 | 1.3 | 308 | 96.0 | 0.41 | 7.2 | 4.9 | 20,900 |
| 23 | Diallyl phthalate | 0.92 | 2.0 | 1.4 | 219 | 97.0 | 0.42 | 2.1 | 1.9 | 14,700 |
| 24 | Diethyl n-butylmalonate | 1.10 | 2.5 | 1.2 | 248 | 95.5 | 0.40 | 7.6 | 5.7 | 16,900 |
| 25 | Diethyl phenylmalonate | 0.89 | 2.3 | 1.7 | 230 | 94.6 | 0.39 | 9.8 | 9.9 | 16,000 |
| 26 | Diethyl 1,2-cyclohexane-carboxylate | 0.83 | 2.4 | 1.5 | 293 | 95.0 | 0.40 | 4.9 | 8.5 | 20,100 |
| 27 | Di(2-ethylhexyl) 1,2-cyclohexanecarboxylate | 1.83 | 2.4 | 0.8 | 270 | 93.8 | 0.42 | 9.1 | 8.1 | 18,500 |
| 28 | n-Butyl benzoate | 0.88 | 3.1 | 0.6 | 186 | 92.5 | 0.42 | 9.1 | 8.1 | 13,000 |
| 29 | Phenyl benzoate | 0.96 g | 2.9 | 0.5 | 184 | 92.7 | 0.39 | 10.5 | 7.7 | 12,800 |

EXAMPLE 30

[I] Synthesis of a catalyst

Twenty grams of $MgCl_2$, 4.2 ml of diethyl phthalate and 3.0 ml of methylpolysiloxane (having a viscosity of 100 centistokes at 25° C.) were put under an atmosphere of nitrogen in a stainless steel (SUS-32) ball mill container having an inner capacity of 800 ml and an inside diameter of 100 mm and containing 2.8 kg of stainless steel (SUS-32) balls each having a diameter of 15 mm, and contacted with each other for 24 hours at an impact acceleration of 7 G. Ten grams of the resulting co-pulverization product was suspended in 100 ml of $TiCl_4$, and the suspension was stirred at 120° C. for 2 hours. The solid portion was then collected by hot filtration, and washed fully with hexane and hot kerosene to obtain a titanium composition, which contained 2.0% by weight of Ti, 66.0% by weight of Cl, 22.0% by weight of Mg and 6.3% by weight of diethyl phthalate. Two grams of the titanium composition was suspended in 100 ml of purified kerosene, and 1.0 ml of triethyl aluminum and 0.56 ml of ethyl silicate were added. The mixture was stirred at 20° C. for 1 hour. The solid portion was collected by filtration, and washed with kerosene to obtain a titanium catalyst component which contained, as atoms, 1.8% by weight of Ti, 63.0% by weight of Cl, 20.0% by weight of Mg, 0.9% by weight of diethyl phthalate and 1.9% by weight of Si.

specific polymerization activity of the titanium catalyst component was 23,800 g of polypropylene/mmole of Ti.

The odor of the resulting polymer was ranked D.

EXAMPLE 31

[I] Synthesis of a catalyst

A 200 ml glass flask was charged with 4.8 g of $MgCl_2$, 25 ml of decane and 23 ml of 2-ethylhexanol, and they were reacted at 120° C. for 2 hours to form a uniform solution.

A 400 ml glass flask was charged with 17 ml of $TiCl_4$ and 133 ml of decane, and while maintaining them at −10° C., all the uniform solution obtained as above was added dropwise over the course of 1 hour. The temperature was then raised to 120° C. Diisobutyl phthalate (2.7 ml) was added, and the mixture was stirred for 2 hours. The solid portion was collected by filtration, and suspended in 200 ml of fresh $TiCl_4$. The suspension was stirred at 120° C. for 2 hours. The solid portion was collected by hot filtration, and washed fully with hexane and hot kerosene to give a titanium composition which contained, as atoms, 2.3% by weight of tetravalent Ti, 70.0% by weight of Cl, 21.0% by weight of Mg and 5.0% by weight of diisobutyl phthalate.

Two grams of the titanium composition was suspended in 100 ml of purified kerosene, and 1.2 ml of triethyl aluminum and 0.7 ml of phenylethoxysilane were added. The mixture was stirred at 20° C. for 1 hour. The solid portion was collected by filtration and washed with kerosene to give a titanium catalyst component which contained, as atoms, 2.1% by weight of Ti, 66.0% by weight of Cl, 19.0% by weight of Mg, 0.9% by weight of diisobutyl phthalate and 2.0% by weight of Si.

[II] Polymerization

Using the resulting titanium catalyst instead of the titanium catalyst composition used in Example 1, the same polymerization as in Example 1 was carried out. Filtration gave 384 g of a powdery polymer having a boiling n-heptane extraction residue of 98.0%, a bulk density of 0.40 and an MI of 3.9 g/10 min. The polymer had an average particle diameter of 240 microns and such a particle size distribution that 100% of the polymer had a particle diameter in the range of 0.1 to 1.0 mm. The polymer was in the form of granules. Concentration of the filtrate gave 2.7 g of a solvent-soluble polymer. Accordingly, the average specific polymerization activity of the titanium catalyst was 25800 g of polypropylene/mmole of Ti.

The odor of the resulting polymer was ranked D.

EXAMPLE 32

[I] Synthesis of a catalyst

A 500 ml glass flask was charged with 20 g of $MgCl_2$, and it was suspended in 200 ml of purified kerosene. With stirring, 50 ml of ethanol was added dropwise at room temperature over 1 hour. Then, 45 ml of diethyl aluminum monochloride was added dropwise at 40° C. over 1 hour. After the addition, 25 ml of $TiCl_4$ was added dropwise over 1 hour at room temperature, and the mixture was stirred for 1 hour. The solid portion was collected by filtration and washed with hexane to give a titanium composition containing, as atoms, 5.8% by weight of Ti, 65.0% by weight of Cl, and 17.0% by weight of Mg. One gram of the titanium composition was suspended in 100 ml of purified kerosene, and 0.5 ml of triethyl aluminum and 0.3 ml of phenylethoxysilane were added. The mixture was stirred at 20° C. for 1 hour. The solid portion was then collected by filtration and washed with kerosene to give a titanium catalyst component which contained as atoms, 4.4% by weight of Ti, 51.0% by weight of Cl, 15.0% by weight of Mg and 2.2% by weight of Si.

[II] Polymerization

Hexane (1.0 liter) was charged into a 2-liter autoclave, and under an atmosphere of $N_2$, 1.0 mmole of triethyl aluminum and 0.02 mmole, as Ti atom, of the titanium catalyst were charged. Then, hydrogen ($H_2$) under 4 kg/cm$^2$ was introduced, and while ethylene was added so that the total pressure became 8 kg/cm$^2$, ethylene was polymerized at 80° C. for 2 hours. After the polymerization, the polymer slurry was filtered to give 296 g of a powdery polymer having a bulk density of 0.35 g/ml, an MI of 4.0 g/10 min. and an $M_W/M_N$ ratio, determined by gel-permeation chromatography, of 5.8.

The odor of the resulting polymer was ranked D.

COMPARATIVE EXAMPLE 2

The procedure of Example 32 was repeated except that the titanium composition obtained in Example 32 was used alone without further treatment. Filtration gave 313 g of a powdery polymer having a bulk density of 0.32 g/ml, an MI of 4.6 g/10 min. and an $M_W/M_N$ ratio of 7.0

What we claim is:

1. A process for polymerizing or copolymerizing olefins, which comprises polymerizing or copolymerizing olefins in the presence of a catalyst composed of
   (A) a solid titanium catalyst component obtained by reacting (i) a titanium composition composed essentially of tetravalent titanium, magnesium, halogen and an electron donor or electron donor residue selected from the group consisting of organic acid esters, alkoxy groups and aryloxy groups with (ii) an organic silicon compound having an Si—O—C bond in the molecule in the presence of (iii) an organoaluminum compound, until the content of the electron donor or electron donor residue in the titanium composition (i) decreases to not more than 90 mole% of that before the reaction and reaches not more than 0.6 mole per gram-atom of Ti, and also until the amount of the silicon compound contained in the titanium composition becomes 0.1 to 50 moles per gram-atom of Ti or by first treating the titanium composition (i) with the organoaluminum compound (iii) and then reacting it with the organic silicon compound (ii), until the amount of the electron donor or electron donor residue in the titanium composition (i) decreases to not more than 90 mole% of that before the reaction, and reaches not more than 0.6 mole per gram atom of Ti, thus including 0.1 to 50 moles of the silicon compound per gram-atom of Ti in the titanium composition, and;
   (B) an organoaluminum compound.

2. The process of claim 1 wherein said electron donor or electron donor residue is an organic carboxylic acid.

3. The process of claim 1 wherein said electron donor is a $C_1$-$C_{12}$ alkyl ester of a carboxylic acid selected from the group consisting of aliphatic dicarboxylic acids, alicyclic dicarboxylic acids, aromatic monocarboxylic acids and aromatic dicarboxylic acids each having 8 to 24 carbon atoms.

4. The process of claim 1 wherein the solid titanium catalyst component (A) is a solid catalyst component obtained by separating the solid reaction product from the reaction mixture.

5. The process of any one of claims 1, 2 or 3 wherein the solid titanium catalyst component (A) is a solid catalyst component obtained by separating the solid reaction product from the reaction mixture after the aforesaid reaction, and washing it with an inert organic solvent.

6. A process for polymerizing or copolymerizing olefins, which comprises polymerizing or copolymerizing olefins having at least 3 carbon atoms, or copolymerizing an olefin having at least 3 carbon atoms with a minor proportion of ethylene, in the presence of a catalyst composed of
   (A) a solid titanium catalyst component obtained by reacting (i) a titanium composition consisting essentially of tetravalent titanium, magnesium, halogen and an organic acid ester with (ii) an organic silicon compound having an Si—O—C bond in the molecule in the presence of (iii) an organoaluminum compound until the content of the organic acid ester in the titanium composition decreases to not more than 90 mole% of that before the reaction and reaches not more than 0.6 mole per gram-atom of Ti and also until the amount of the organic silicon compound (ii) to be included in the titanium composition (i) becomes 0.1 to 50 moles per gram-atom of Ti, and (B) an organoaluminum compound.

7. The process of claim 6 wherein the solid titanium catalyst component is a solid catalyst component obtained by separating the solid reaction product from the reaction mixture after the reaction, and washing it with an inert organic solvent.

* * * * *